Oct. 7, 1941.  J. F. KALETAY  2,258,140
COMBINED CAMERA AND LIGHT CONTROL APPARATUS
Filed Nov. 23, 1937  4 Sheets-Sheet 1

INVENTOR
JOSEPH F. KALETAY
BY
ATTORNEY

Oct. 7, 1941.　　　J. F. KALETAY　　　2,258,140
COMBINED CAMERA AND LIGHT CONTROL APPARATUS
Filed Nov. 23, 1937　　　4 Sheets-Sheet 2
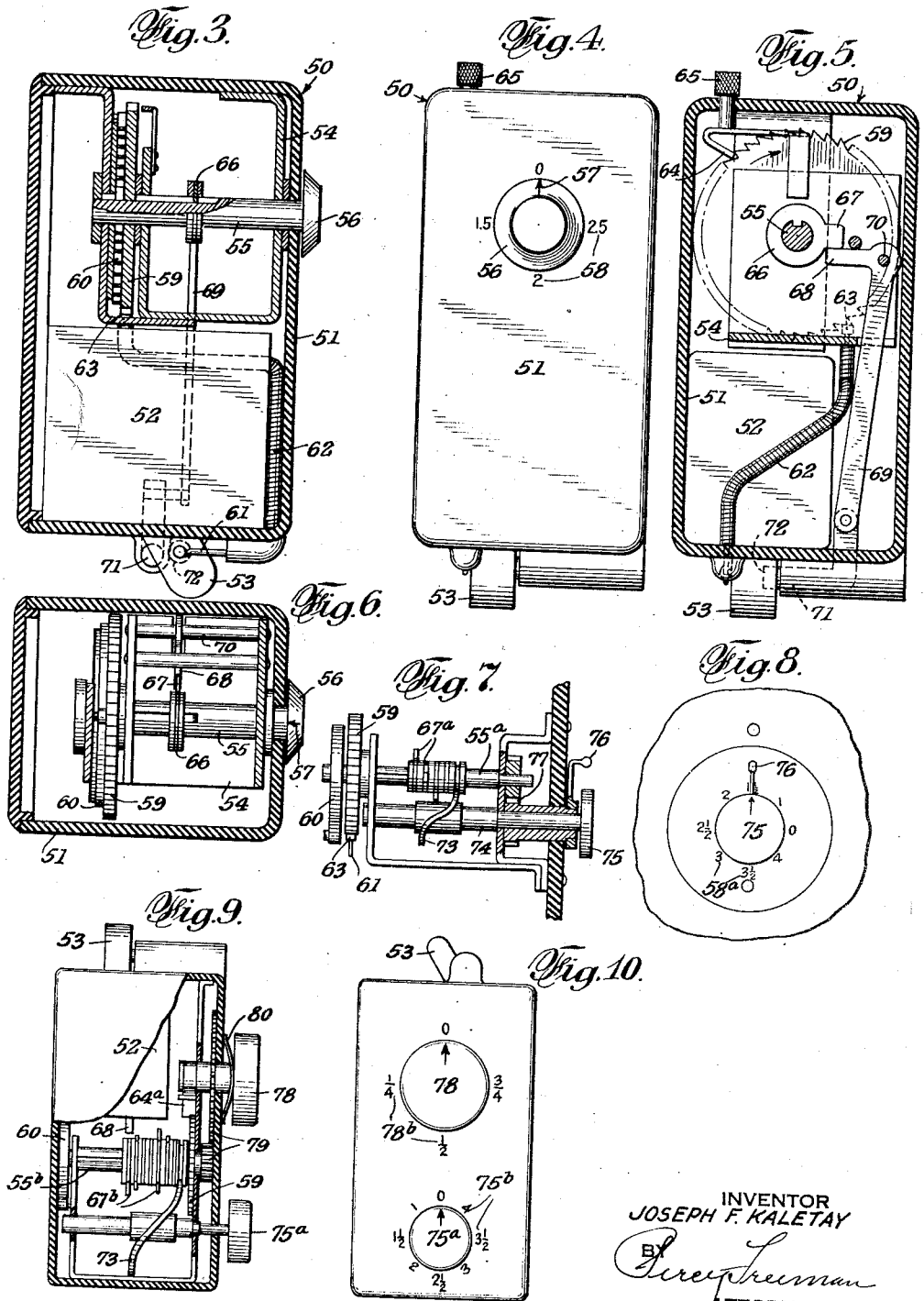
INVENTOR
JOSEPH F. KALETAY
BY
ATTORNEY

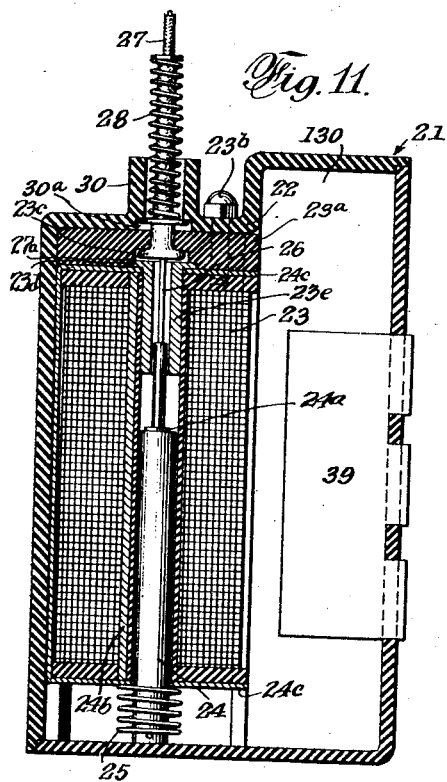
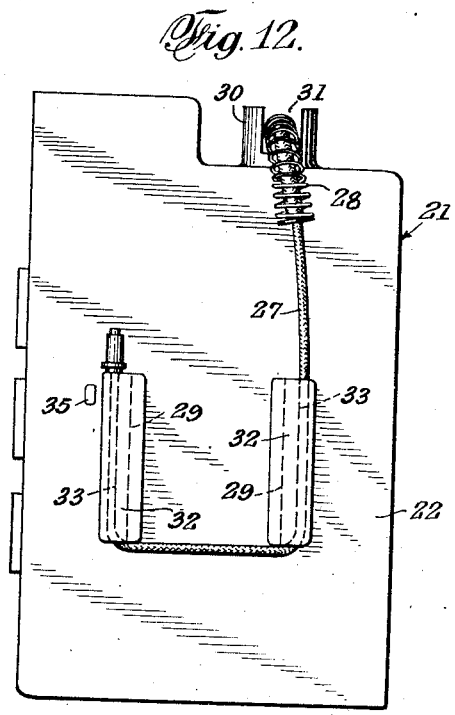
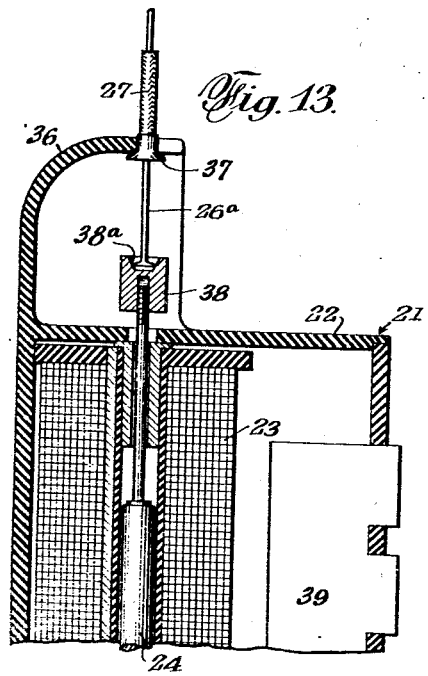
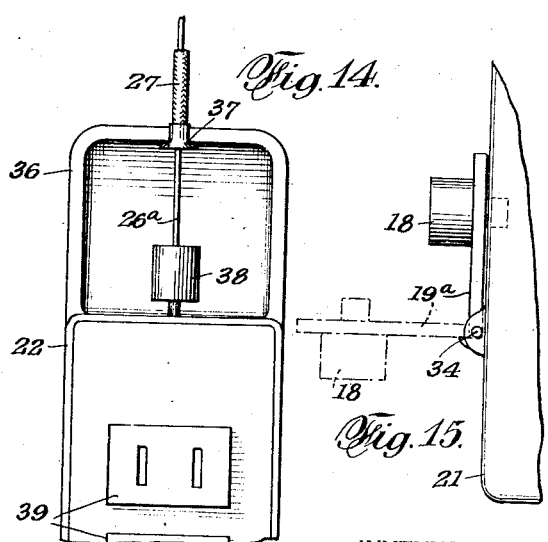

Oct. 7, 1941.                J. F. KALETAY                 2,258,140
                COMBINED CAMERA AND LIGHT CONTROL APPARATUS
                    Filed Nov. 23, 1937         4 Sheets-Sheet 4
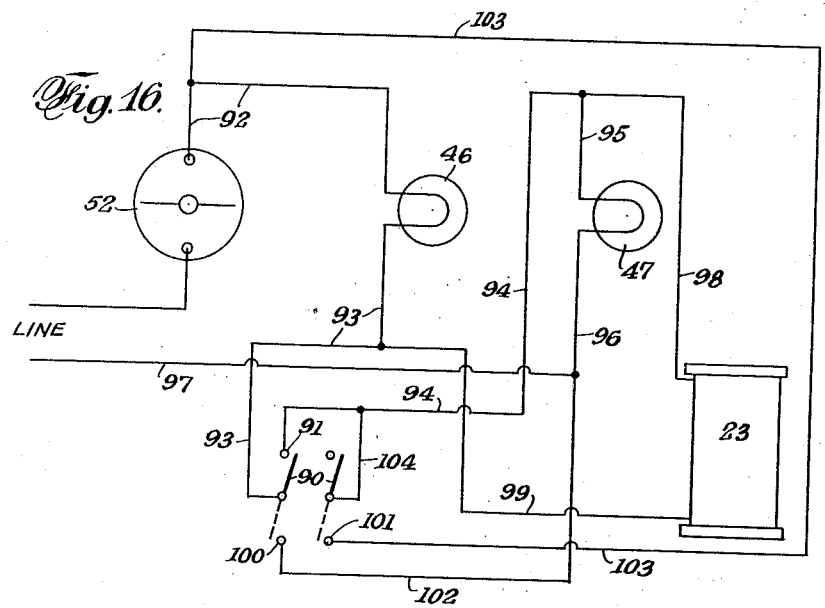
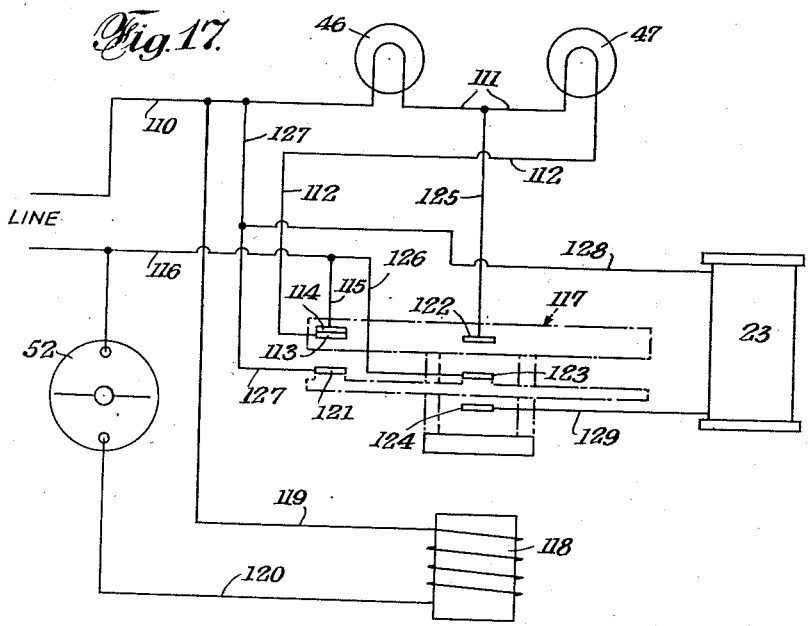
INVENTOR
JOSEPH F. KALETAY
BY
ATTORNEY Patented Oct. 7, 1941

2,258,140

UNITED STATES PATENT OFFICE 2,258,140

COMBINED CAMERA AND LIGHT CONTROL APPARATUS

Joseph F. Kaletay, Reaville, N. J.

Application November 23, 1937, Serial No. 176,045

7 Claims. (Cl. 95—53)

This invention relates to a combined control for cameras and lighting therefor and more particularly to a system wherein the camera shutter and the lighting means are simultaneously and variably operable.

The introduction of photo-flood lamps coupled with improved photographic film, have made the art of photography employing artificial illumination, increasingly popular. One method in common use entails the employment of photo-flash lamp and fast registering sensitive film. This method is costly since the lamps may be used once only and the film commands a price premium. Where photo-flood lamps have been used, their useful life was curtailed by lighting them during long periods when the camera was inactive. Since, at best, these lamps afford only a few hours of service, much of their lighting was wasted.

Prior devices, seeking to overcome these faults, have been quite complicated and expensive, and while perhaps adapted for limited use by professional photographers, have found no field of use among amateur camera users because of their great cost and complex construction.

The present invention, seeking to obviate the above faults, contemplates the provision of photographic apparatus designed to afford proper illumination of the subject only for the period of time that the camera shutter is open to expose the film.

The invention further contemplates the provision of improved switch means for simultaneously operating the camera shutter and the floodlamps, said switch means being pre-settable to vary the exposure time.

Another contemplated feature of the invention resides in the improved and convenient manner of arranging the apparatus wherein the control means may be remote from the camera to afford greater flexibility of use.

In its present aspect, the invention comprises a pre-settable time switch for simultaneously energizing a solenoid which operates the camera shutter release and lighting one or more flood-lamps positioned to illuminate the subject.

The invention also contemplates novel electrical circuit arrangements. One form of circuit includes means preferably in the form of a switch for either connecting the flood lamps in series and short circuiting the shutter operating solenoid, or connecting the flood lamps and the solenoid in parallel, and in the other, incorporating a relay in the circuit for breaking the series circuit of the lamps and making the mentioned parallel circuit. In both forms of arrangement, the series circuit will illuminate the lamps somewhat dimly so the subject to be photographed may be posed without subjecting the photographer and the subject to undue glare and to the normally excessive light of the fully illuminated lamps, said latter condition being desirable only when the actual photographing is being done. It is than that the mentioned parallel arrangement is made.

Other features, advantages, and objects of the invention reside in the provision of an improved time switch; in efficient and simple camera release actuating means, preferably in the form of a solenoid; in simple and quickly operable means for mounting the camera and the shutter release means; and in the various details of construction comprising the parts of the apparatus.

With the above and other objects in mind, the invention comprises the apparatus as illustrated, in an exemplary manner, in the accompanying drawings which are described in detail in the following specification, and in which:

Fig. 3 is a vertical sectional view through a preferred time switch construction.

Fig. 4 is a front view thereof.

Fig. 5 is a vertical sectional view through the time switch shown in Fig. 3 and on a plane at right angles thereto.

Fig. 6 is a plan sectional view through the time switch shown in Figs. 3, 4, and 5.

Fig. 7 is a fragmentary detail sectional view showing another form of time switch.

Fig. 8 is a front view thereof.

Fig. 9 is a partial elevational, partial sectional view of still another form of time switch.

Fig. 10 is a front view thereof.

Fig. 11 is a vertical sectional view of a combined cable release actuating and outlet block unit.

Fig. 12 is a side view thereof.

Fig. 13 is a broken sectional view of an alternate form of unit shown in Fig. 11.

Fig. 14 is a front view thereof.

Fig. 15 is a fragmentary front view of the mentioned combination unit showing an alternate form of mounting therefor.

Fig. 16 is an electrical diagram of another form of circuit employed in the invention.

Fig. 17 is still another form of circuit employing a relay.

Figure 1:
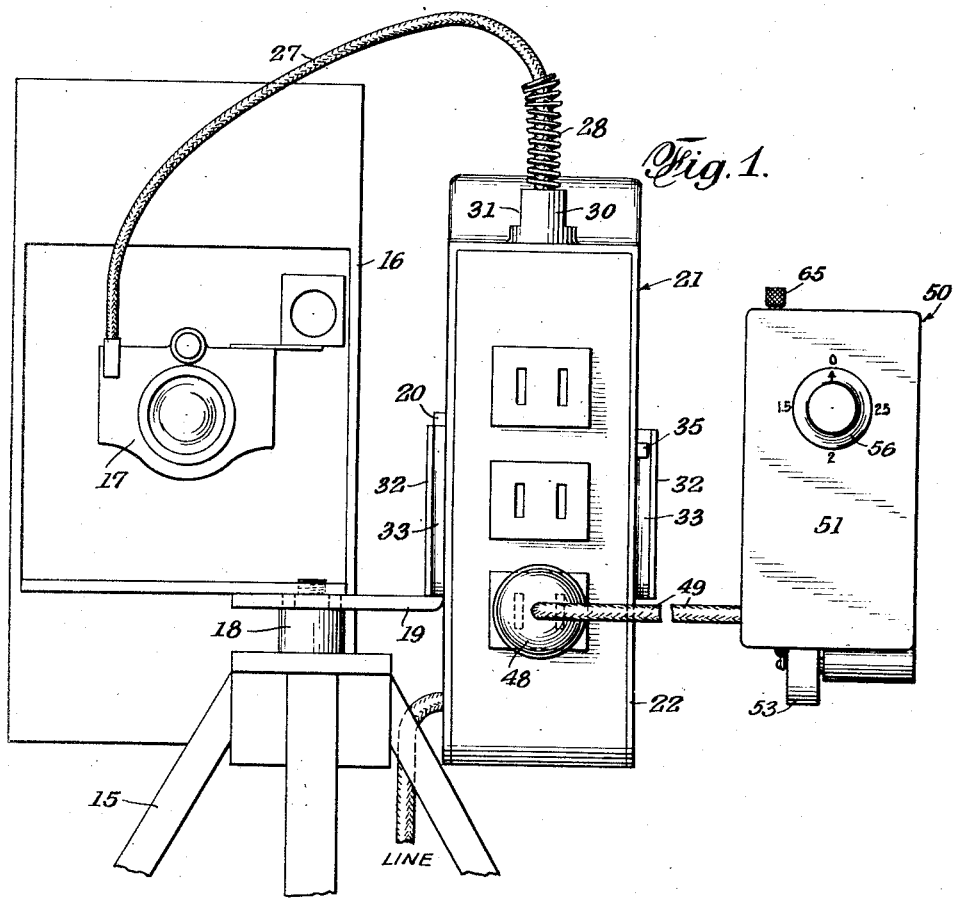
Fig. 1 is a front view of a camera in combination with cable release and time switch actuating means.

Referring to the drawings in detail, Fig. 1 shows a tripod 15 upon which is mounted a camera 16 provided with a shutter 17. In its preferred embodiment the connection means 18 between the tripod and camera, is preferably provided with a bracket 19 having an upstanding leg 20.

As herein contemplated, the present combination includes a unit 21 comprising, in combination, a cable release actuating means and electrical outlet blocks. The details of this unit are shown in several forms in Figs. 11 to 15 inclusive and diagrammatically illustrated in Fig. 2.

Referring now to Figs. 1, 11, and 12, the unit 21 comprises a casing 22 in which is positioned an electric solenoid 23 provided with a floating core 24. The lower end of the core is preferably provided with means such as the spring 25 for maintaining said core in its low position and the upper end of the core is connected to a shutter actuating wire member 26 which is disposed within the flexible cable sheath 27. The latter is formed with a head 27a caught in a shoulder in the block 23a locked between the solenoid 23 and the casing 22, as by means of the screws 23b. The head 27a is disposed in a recess 23c in said block, said recess being closed by the upper flanged portion 23d of a sleeve 23e fitted in the solenoid above the core 24. The mentioned shoulder in the block 23a and the mentioned flanged portion 23d form a pocket in which the head 27a is revolubly confined. In this manner the cable 27 is effectively positioned and the solenoid securely held in the casing.

In order to prevent fraying of the sheath 27 which may be caused by unduly sharp bending at the point where it emerges from the casing 22, a helical spring 28 or its equivalent is strung around the sheath at that point. The lower end of the spring 28 is preferably enlarged and positioned in a shouldered seat 30a in the casing and is thus held against removal by said seat and the mentioned block 23a.

When the unit 21 is out of use, the cable release comprising the wire 26 and sheath 27 would be a source of annoyance when storing said unit. For this reason means are provided for neatly arranging said cable release along one side of said casing. To this end, the casing is formed with an embossment 30 in the form of an upstanding collar, said collar being provided with a slot 31, and one or both walls of the casing may be provided with cleat-like portions 32 having grooves at 33. Thus, when the unit 21 is to be stored out of use, the cable release may be bent through the slot 31, arranged about the cleats 32 in the grooves 33, and maintained in this position by means of a lug 35 past which the cable must be squeezed.

The above describes a special construction for the purpose, but where the camera is already provided with a cable release the form shown in Figs. 13 and 14 may be employed. In this form the casing 22 is provided with a hood-like extension 36 on which is caught the ferrule 37 of the sheath 27, and the actuating wire 26a is arranged to engage a block 38 carried by the solenoid core 24. The block 38 is threadedly engaged on a reduced upward extension of the solenoid core 24, so that it may be adjusted longitudinally to engage the end of the cable 26a. A conical seat 38a is formed in the top of said block so different sized cable ends may be received therein and properly aligned with the core.

The casing of either form of unit 22 is also arranged to carry a block 39 in which are arranged a plurality of pairs of electrical contacts such as 40—41, 42—43, and 44—45. The contacts 40—41 are designed to receive the connection plug of a flood lamp 46, and the contacts 42—43 the connection plug of a flood lamp 47. The contacts 44—45 are designed for the reception of a plug 48 of a conductor 49 from a time switch unit generally shown at 50. These connections are best seen from the diagram in Fig. 2.

Because the unit 21 is provided with actuating means for operating the cable release, this unit is preferably fixedly associated with the camera, and for this reason the cleats 32 are provided with inwardly directed grooves 29 for the accommodation of the upstanding leg 20 of the previously mentioned connection means 18. Instead of the bracket 19 and the connection means 18 comprising a separate unit, the casing 21 may have hinged thereon, as at 34, a bracket 19a adapted to be swung, when out of use, to a position against the side of said casing as seen in Fig. 15.

The time switch unit 50, most clearly shown in Figs. 3 to 6 inclusive, comprises a casing 51 in which is disposed a switch 52 provided with a switch lever 53, the conductor 49 being connected to said switch 52.

In the present instance, it is desired to time the camera exposure through the energizing of the solenoid 23 by the manual actuation of the switch lever 53 and the automatic release thereof by the following mechanism disposed within the casing 51 of the time switch.

A bracket 54 is preferably carried within the casing 51 and upon this bracket there is mounted a shaft 55 having a control knob 56 carrying an index mark 57 which may be read in association with markings 58 on the face of the casing. The shaft 55 carries a ratchet wheel 59 and a spirally-wound spring 60 having one end connected with the shaft and the other to a fixed portion such as the bracket 54. It is apparent from the foregoing that the spring 60 may be wound by turning the knob 56, and in the present instance only one complete revolution of said knob is intended.

As shown in Figs. 3 and 5, the switch handle 53 is connected with one end of a wire 61 which is disposed in a sheath 62 and provided at its other end with a detent 63 having engagement with the teeth of the ratchet wheel 59. Thus, when the lever 53 is moved toward the left (Fig. 3) the detent 63 is removed from engagement with said ratchet wheel to free it for rotation under the urgency of the spring 60, but since the unwinding of the spring 16 under these conditions would be substantially instantaneous, it is desired to include a click pawl 64 having engagement with the teeth of the ratchet wheel to retard the rotation thereof. The pawl will operate in the unwinding direction of the ratchet wheel and spring, and when the shaft 55 is to be set for timing the switch, this pawl may be raised out of engagement with the ratchet as by means of the knob handle 65.

Upon the shaft 55 there is disposed a member 66 provided with a lug 67 arranged to have engagement with the arm 68 of a bell crank lever 69 pivoted at 70 and connected at its lower end to a detent 71 arranged to engage in an opening 72 in switch lever 53.

The spring 60, the ratchet 59, and the click pawl 64 are all designed in the present showing, to impart a rotational duration to the shaft 55 of somewhat more than 2½ seconds. Thus when the index mark 57 is turned anti-clockwise and aligned with the marking 2.5 on the casing, removal of the detent 63 from engagement with the ratchet teeth will release the ratchet wheel to be rotated by the spring back towards zero and at this point the lug 67 will engage the arm 68 of the bell crank lever 69 to withdraw the detent 71 from the opening 72. The removal of the detent 63 is accomplished through the moving of the switch lever 53 toward the left of Fig. 3 so that the detent 71 may engage in the opening 72. It is apparent from the above that the operator merely manipulates the lever 53, and the period of time that it takes the lug 67 to trip the detent 71 is controlled by the original setting of the knob 56. It is, of course, understood that the timer may be designed for any periods of time, and the switch lever 53 may be held manually for longer periods of time than are arranged for in the timer.

Another form of timer is shown in Figs. 7 and 8 wherein a plurality of lugs 67ª may be employed, said lugs being slidably mounted on the shaft 55ª. In this form, the desired lug 67ª may be positioned for engagement with the bell crank lever 69 as by means of a cam 73 on the shaft 74 and controlled by a knob 75. The angular disposition of said lugs may be had by manipulation of the lever 76 as read in connection with the scale 58ª, a pair of gears 77 permitting this. In other respects, the portions illustrated in Figs. 3–6 inclusive may be incorporated with this structure to complete the device.

Another form of timer is illustrated in Figs. 9 and 10, and in this form it is contemplated to impart several revolutions to the spring shaft 55ᵇ as by means of the knob 78 through the medium of gearing 79. The pawl 64ª, the counterpart of the pawl 64, is mounted with said knob to have engagement with the ratchet 59 and to be removed from said engagement during winding of the spring by pushing the knob 78 inward against the leaf spring 80. Thus, the switch lever 53 may be manipulated several times before the spring 60 needs rewinding. In this form the lugs 67ᵇ may each be of different form. One of these may have one lug; another, two lugs; a third, four lugs; and so on. The amount of power left in the spring 60 may be read from the position of the arrow on the knob 78 in relation to the scale 78ᵇ, and the position of the timing lugs 67ᵇ may be read from the position of the arrow on the knob 75ª in relation to the scale 75ᵇ.

Figure 2:
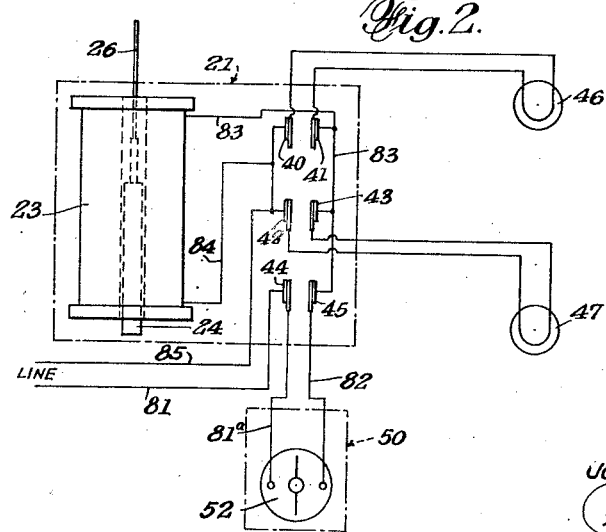
Fig. 2 is an electrical diagram employed in the above-mentioned combination.

Referring now to the electrical diagram shown in Fig. 2, the timer switch 52 is shown as being connected with the terminals 44—45 and electrical current from a suitable source is connected to the terminals 40, 42, and 44. Thus when the switch 52 is closed, the circuit flows in the line 81 to the line 81ª, through said switch, to the line 82, the line 83, the solenoid 23, the line 84, and the line 85. In this manner, the solenoid is energized to cause actuation of the cable release means. Simultaneously a circuit is established to the flood lamps 46 and 47, as apparent from the diagram.

It may be desirable to arrange the electrical circuit so that the flood lamps may be connected in series as during the posing and arranging of the subject to be photographed. In series, the voltage supplied to these lamps would be divided between them and they would therefore burn somewhat dimly. Then, when they are thrown into parallel, they will burn with their maximum illumination.

The arrangement shown in Fig. 16 provides for this type of operation. During posing of the subject, the switch 90 is positioned to contact the terminal 91. Now when the time switch 52 is closed, the current will flow from the line, through said time switch, through conductor 92, lamp 46, conductor 93, to terminal 91, through conductors 94 and 95, lamp 47, and conductors 96 and 97, back to the line. The solenoid 23 being connected in parallel with this circuit by means of the connections at 99, will be shorted and will therefore not operate to actuate the camera shutter.

When the subject is to be photographed, the switch 90 is positioned to contact the terminals 100 and 101. Now when the time switch 52 is closed each of the lamps and the solenoid will be connected in parallel circuits, the circuit for the lamp 46 being from the line through switch 52, conductor 92, lamp 46, conductor 93, switch 90, terminal 100, and conductors 102 and 97 to the line; the circuit for the lamp 47 being from the line, through the switch 52, conductors 92 and 103, terminal 101, switch 90, conductors 104, 94, and 95, lamp 47, and conductors 96 and 97 to the line; and the circuit for the solenoid being from the line through the switch 52, conductors 92 and 103, terminal 101, switch 91, conductors 104, 94, and 98, solenoid 23, conductors 99 and 93 to switch 91, terminal 100, and conductors 102 and 97 to the line.

As illustrated in Fig. 17, the wiring diagram may incorporate a relay for changing the lamp connections from series to parallel. In this arrangement the lamps are in series until the time switch is operated and at the completion of the operation thereof, return to series.

The series connection of the lamps is from the line through the conductor 110, lamp 46, conductor 111, lamp 47, conductor 112, contacting terminals 113 and 114, and conductors 115 and 116 to the line.

When the time switch 52 is closed, the relay 117 is operated through the energization of the electromagnet 118 connected to the line by conductors 110, 119 and 120 through said time switch. The contact between the terminals 113 and 114 is broken and contact is made between terminals 113 and 121. At the same time contact is made among the terminals 122, 123, and 124.

The circuit for the lamp 46 is from the line through the conductor 110, lamp 46, conductors 111 and 125, terminals 122 and 123, and conductors 126 and 116 to the line. The circuit for the lamp 47 is from the line, through the conductors 110 and 127, terminals 121 and 113, conductor 112, lamp 47, conductors 111, and 125, terminals 122 and 123, and conductors 126 and 116 to the line.

The circuit for the solenoid 23 is from the line through conductors 110, 127, and 128, solenoid 23, conductor 129, terminals 124 and 123, and conductors 126 and 116 to the line.

It will be noted that as the relay operates, the lamp contact terminals 113, 121 and 122, 123 are contacted first and then the solenoid contact terminals 123, 124 are contacted. This provides for full illumination of the lamps before the solenoid operates to actuate the camera shutter. When the switch 52 resumes its "off" position, the relay will resume its initial position and during this operation, the solenoid contacts will open first and then the parallel connection of the lamps will be opened.

It is preferred to design the solenoid with a lag sufficient to permit full illumination of the flood lamps before the core 26 is actuated by the energization of said solenoid so that the camera shutter is not opened until full illumination has been obtained. This lag may be provided in several ways. One, is to design the spring 25 to cause retarding of the movement of the solenoid core, another is to incorporate a gravitational pull on said core, and a third is to provide a mechanical transfer of power which may be regulated to afford the proper time delay so the flood lamps may reach full illumination before the camera shutter is opened.

If the circuit shown in Fig. 16 is employed, the casing 21 may be formed with an offset portion in order to provide a chamber 130 in which may be positioned the switch 90. This chamber may also be used to house the relay 117 when the circuit shown in Fig. 17 is used. This is done to obviate the handling of separate portions of the contemplated mechanism which essentially comprises the unit 21 and the unit 50.

From the foregoing disclosure it is apparent that the several units comprising the system herein contemplated may be each varied in construction and arrangement in many ways.

What I claim as new and desire to secure by Letters Patent is:

1. In combination, a camera having a shutter, shutter actuating means, means for operating said shutter actuating means, and means for vertically slidably mounting the last-mentioned means in definite removable relation to said camera, said operating means comprising a solenoid having a movable core operably associated with the mentioned shutter actuating means.

2. An article of manufacture comprising a casing, an electromagnet in said casing, a movable core in said electromagnet, a camera shutter actuating member movable by said core, as it approaches the end of its stroke an electric receptacle for receiving electric current also mounted in said casing, and electric circuit connections between said receptacle and said electromagnet, and a control switch in said circuit.

3. An article of manufacture comprising a casing, an electromagnet in said casing, a movable core in said electromagnet, a camera shutter actuating means operatively associated with said core, said shutter actuating means comprising a member movable by said core and a sheath therearound, flexible means for obviating unduly sharp bending of said sheath, and means for maintaining said sheath disposed along one wall of the mentioned casing, said last-mentioned means comprising a cleat-like portion on said wall having grooves for the accommodation of said sheath.

4. In combination, a camera having a shutter, shutter actuating means, means for operating said shutter actuating means, a casing for the latter, and means for readily detachably mounting the said casing in definite relation to said camera, said last mentioned means comprising a member having threaded engagement with the camera and a bracket having sliding engagement with said casing and pivotal engagement with the member.

5. An article of manufacture comprising a casing, an electromagnet in said casing, a movable core in said electromagnet, and a camera shutter actuating member extending into said electromagnet and directly movable by said core as it approaches the end of its stroke.

6. An article of manufacture comprising a casing, a solenoid in said casing, means for mounting said solenoid to a wall of said casing, a block interposed between said wall and said solenoid, camera shutter actuating means associated with said solenoid and having a sheath terminating in a head, said head being disposed in a recess in said block, and a member closing said recess and confining said head, said member being disposed in the bore of said solenoid.

7. In combination, a camera having a shutter, shutter actuating means, means for operating said shutter actuating means, and means for slidably detachably mounting the last-mentioned means in definite relation to said camera, said operating means comprising a solenoid having a movable core, a part of said actuating means extending into said solenoid adjacent to and directly contactable by the mentioned core, a stop for said core to limit the length of its actuating stroke, said stop being arranged within the solenoid, and means independent of the shutter actuating means to return the core to its initial position.

JOSEPH F. KALETAY.